United States Patent [19]

Seeley et al.

[11] 3,987,212

[45] Oct. 19, 1976

[54] CHOLESTEROL FREE EGG PRODUCT

[75] Inventors: Robert D. Seeley, Crestwood; Harold J. Hartmann, St. Louis County; Daniel R. Sidoti, Ballwin, all of Mo.

[73] Assignee: Anheuser-Busch, Incorporated, St. Louis, Mo.

[22] Filed: July 18, 1974

[21] Appl. No.: 489,592

[52] U.S. Cl. ............................... 426/614; 426/804
[51] Int. Cl.² ........................................... A23L 1/32
[58] Field of Search ............ 426/65, 175, 211, 222, 426/348, 533, 614, 650, 657, 804

[56] References Cited
UNITED STATES PATENTS

| | | | |
|---|---|---|---|
| 3,475,180 | 10/1969 | Jones | 426/348 X |
| 3,591,391 | 7/1971 | Kinoshita et al. | 426/222 |
| 3,627,539 | 12/1971 | Ikeda et al. | 426/222 |
| 3,840,683 | 10/1974 | Strong | 426/211 X |

*Primary Examiner*—Raymond N. Jones
*Assistant Examiner*—R. A. Yoncoskie
*Attorney, Agent, or Firm*—Gravely, Lieder & Woodruff

[57] ABSTRACT

This disclosure covers a frozen egg product which can be used to make scrambled eggs, omelets, etc., and which contains in the egg-derived solids essentially none of the fat and cholesterol of whole egg solids. The product is comprised of a mixture of liquid egg whites and egg white solids and may contain other ingredients such as non-fat milk solids, water, carboxymethyl cellulose, vegetable gums, edible alkaline salts, flavor enhancers etc., to improve the eating quality of the egg product cooked under a variety of conditions. The product containing egg whites is made by blending egg whites and small amounts of non-fat milk solids, vegetable gums, and flavor enhancers and preferably raising the pH between 9.0 and 10.0 with an alkaline salt, packaging and freezing. The egg white solids may be derived from liquid egg whites, concentrated egg whites, reconstituted freeze-dried egg whites, or reconstituted spray dried egg whites.

11 Claims, No Drawings

CHOLESTEROL FREE EGG PRODUCT

REFERENCE TO PENDING APPLICATIONS

This application contains subject matter in common with co-pending application of R. D. Seeley Ser. No. 237,563, filed Mar. 23, 1972, now U.S. Pat. No. 3,843,811, entitled LOW FAT EGG PRODUCT and co-pending application of R. D. Seeley Ser. No. 267,447, filed June 29, 1972 entitled CHOLESTEROL FREE EGG PRODUCT.

BACKGROUND OF THE INVENTION

This invention relates to a new and improved egg product and a process for making same.

The edible portion of whole eggs contains approximately 25% egg solids and 75% water, 12% protein and 11% fat. When the term whole eggs is used, this is the product meant. The contents of the shell egg are partitioned between egg white and egg yolk. Egg yolk makes up about 39% of the freshly cracked egg and contains approximately 45% solids, 14% protein and 30% fat. The yolk contains about 2% cholesterol. When the term egg yolk is used, this is the product meant. The liquid egg white makes up about 61% of the whole egg and contains approximately 12% solids, 10% protein and only a trace of fat. There is no cholestrol in egg whites. When the term egg whites is used, this is the product meant. When the terms egg white solids and egg yolk solids are used, we mean the actual solids on a dry basis. The relative amounts of egg white to egg yolk vary in eggs from different flocks, but the composition of egg white and egg yolk is more uniform.

In recent years it has been shown that in man there is a relationship between dietary cholesterol and circulatory disorders such as atheroschlerosis. It is also well known that there is a direct relationship between obesity and health. It is well recognized that eggs form an important part of the diet with over 70 billion eggs a year being consumed for table use. The quality of the protein of eggs is one of the highest in any natural food product, having a biological value of 100. It would be important in the treatment of patients with circulatory disorders and people who are over-weight to be able to include a liberal amount of egg or egg products in their daily diet as a source of high quality protein, but to provide this protein without accompanying it with the fat and cholesterol contained in shell eggs or frozen whole eggs or in other products containing a significant percentage of whole eggs or egg yolks.

SUMMARY OF THE INVENTION

This invention comprises a cholesterol-free frozen egg product which when cooked has desirable textural and taste characteristics similar to fresh whole eggs. The product is comprised of a yolk-free and essentially fat-free egg mixture containing 80% or more of liquid egg white and 5% or less of dried egg white solids and small percentages of non-fat milk solids, vegetable gums and a mixture of flavor enhancers.

DETAILED DESCRIPTION

When liquid egg whites, before or after freezing, are cooked, the resulting scrambled eggs has a flat taste and a gelatinous-type appearance and mouth feel. The addition of low levels of non-egg ingredients (vegetable starch, vegetable gum, and non-fat milk solids) to liquid egg whites and raising the pH to 9.0 to 10.0 results in an egg product which, when cooked in a double-boiler, has an improved eating quality, primarily textural. The eating quality depends on the quality of the liquid egg whites, the percentages of non-egg ingredients, and the cooking procedure. The cholesterol-free product of this invention has an improved textural quality even when cooked under a variety of conditions.

As previously mentioned, this disclosure covers a frozen egg product which can be used to make scrambled eggs, omelets, etc., which contains in the egg derived solids essentially none of the fat cholesterol of whole eggs. The product is comprised of compositions of egg based products that have been formulated containing high levels of egg white solids and other non-egg ingredients. In co-pending applications of R. D. Seeley, Ser. No. 237,563, filed Mar. 23, 1972, now U.S. Pat. No. 3,843,811, and Ser. No. 267,447, filed June 29, 1972, are disclosed egg compositions containing little or no egg yolks. The compositions described in these pending applications in most cases have a firm tender eating quality when fried, but many of the compositions are very mealy in eating quality when cooked in a double-boiler. In Ser. No. 267,447 the eating quality of the egg composition when cooked in a double-boiler was improved by raising the pH of the mix to about 9.0 to 10.0.

The most important characteristic of a cooked egg product is its texture. When we are talking about cooked egg products in this application we are talking about scrambled eggs. The texture of scrambled eggs from a whole egg is generally considered to be firm, scrambling up to form large curds when a minimal of stirring is used. The whole scrambled egg has a firm-like mouthfeel without being mushy or mealy. When we describe a cooked egg composition as mealy, it has the texture of grits. When liquid egg whites are cooked in a frying pan, they generally have a gelatin-like mouthfeel. The same is true when they are cooked in a double-boiler.

It has been found that in the cooking of liquid egg compositions there are tremendous variations in cooking operations. Some people cook the liquid egg composition in a skillet with high heat. Under such conditions, cholesterol-free egg compositions will form fairly firm curds and have a firm mouthfeel. If the egg composition contains no yolks, there will be a gelatinous mouthfeel. It has been shown that the addition of non-egg ingredients will minimize this gelatinous mouthfeel and give a more tender firm cooked egg product.

In Ser. No. 267,447, it was found that raising the pH of a yolk-free composition containing mainly egg whites and with non-egg ingredients to between pH 9–10, the double-boiler cooking texture was better than if the pH were the natural pH of the mix, i.e., below 9. However, when such an egg mixture is cooked in a double-boiler or cooked in a large amount slowly in a skillet, or autoclaved, or cooked in a steam jacketed kettle (Groen-type) in a food service operation, there is a variable textural quality to the cooked egg ranging from mushy to mealy; although in some cases, the texture would be a satisfactory firm texture. In all cases, the egg product has a bland flavor, differentiating the flavor from the textural characteristics. As will be explained in more detail hereafter we have discovered that a better tasting fat-free cholesterol-free egg product can be made which can be cooked under a wide variety of cooking conditions and equipment and give a good cooked egg texture and flavor. This product contains primarily egg whites to which a small percentage of dried egg white solids are added in combination with certain non-egg ingredients. The normal pH of this mixture will be 9 or below. In some instances it would be an advantage to raise the pH to about 9.0 to 9.2 but in many cases, this may not be necessary.

Liquid egg whites contain only about 10% protein and 12% solids compared to about 25% solids and 12% protein for whole eggs. The reason that a cholesterol-free egg composition containing egg white solids derived only from liquid egg whites may have poor cooking tolerance under a variety of cooking conditions even when non-egg ingredients are added may be because of the low concentration of solids contained in the preparation. When liquid egg white containing no additives is steam cooked, the cooked product has small grainy curds as shown in Table I. The texture is wet, mushy and mealy. The addition of 2% egg white solids or egg albumen to frozen egg whites changes the steamed cooked texture from mushy and mealy to slightly mealy and rubbery. When three parts of albumen are added plus seven parts of water, the curds are similar to whole eggs but the texture is rubbery. The addition of egg albumen solids definitely minimizes the mushy-mealy characteristics of liquid egg whites whether from a frozen or fresh shell egg condition. Composition No. 2 in Table I contains about 12% egg protein. This is about the protein content of whole egg. composition No. 3 contains about 30% egg white solids which is considerably higher than the egg white solids content of whole egg, but is approximately the same as the total solids content of whole egg.

TABLE NO. I

| Composition | | Steam Cooked Appearance | Steam Cooked Texture | Flavor |
|---|---|---|---|---|
| No. 1 | Frozen egg whites | Small curds, (Fair—) grainy | Mushy, (Fair—) Mealy, Wet | Bland |
| No. 2 | Frozen Egg White + 2% egg albumen solids | Small to Med. (Fair) Size curds | Sl. mealy (Fair) & rubbery | Stronger than No. 1 |
| No. 3 | Reconstituted albumen solids 3 pt. albumen - 7 pt. water | Med. curds similar (Good) to whole egg | Rubbery, (Good—) Mealy | Strong Objectionable |
| No. 4 | Shell egg whites | Small curds, (Fair) grainy | Mushy (Fair—) Mealy Wet | Bland |

Non-egg white solids need to be added to frozen egg whites, even those containing extra egg albumen solids, to minimize or to eliminate the rubbery mouthfeel of cooked egg whites. Table No. II shows a composition containing 84% liquid egg whites to which 3% egg white solids were added and potato flakettes, non-fat milk solids, a vegetable gum, carboxymethyl cellulose (CMC), water, mono and diglycerides (Atmos 300) and a color solution. The pH of this mixture was raised to 9 with potassium hydroxide. This formula cooked to large curds but the eggs were slightly rubbery and mealy. There was a definite improvement in double-boiler cooking tolerance. The addition of potato flakettes, a source of vegetable starch, helps mellow off-flavors and decreases syneresis.

TABLE NO. II

| | % |
|---|---|
| Liquid Egg Whites | 84.00 |
| Egg White Solids | 3.00 |
| Potato Flakettes | 3.00 |
| NFMS | 2.00 |
| CMC (HV) | 0.25 |

TABLE NO. II-continued

| | % |
|---|---|
| Water | 7.62 |
| Atmos 300 | 0.10 |
| Color Solution | 0.03 |
| | 100.00 |

0.18% of 20% KOH solution to raise pH to 9.0

Eating Quality - Double Boiler Cooking
　　Large curds
　　sl. rubbery
　　and mealy
　　objectionable
　　henhouse odor The formulations in Table No. III demonstrate that egg compositions containing over 80% frozen egg whites and an additional amount of dried egg albumen do not require potato flakettes for good cooking tolerance.

TABLE NO. III

| | No. 1 | No. 2 |
|---|---|---|
| Frozen Egg Whites | 84.00% | 87.00% |
| Egg White Solids | 3.00 | 3.00 |
| Potato Flakettes | 3.00 | — |
| NFMS | 2.00 | 2.00 |
| CMC (HV) | 0.25 | 0.25 |
| Water | 7.62 | 7.62 |
| Atmos 300 | 0.10 | 0.10 |
| Color Solution | 0.03 | 0.03 |
| | 100.00% | 100.00% |
| pH (as is) | 8.50 | 8.85 |
| % KOH Sol. (20%) to pH 9.0 | 0.18% | 0.06% |
| Viscosity after homogenization | 2600 cps | 200 cps |
| Syneresis | 1.18% | 4.51% |
| Eating Quality - Double Boiler Cooking | Large curds sl. rubbery and mealy | softer texture |

In Table No. IV are shown the results of cooking an egg-like composition containing a minimum of 85% liquid egg whites to which have been added a small percentage of non-fat milk solids, egg white solids and two different types of carboxymethyl cellulose. A small amount of Atmos 300 (a mixture of mono and diglycerides) was added to prevent foaming. A color solution was added at the 0.3% level. This formulation also contains a mixture of monosodium glutamate, disodium inosinate and disodium guanylate, which are flavor enhancers. The eating quality after double boiler cooking was good, the texture had large curds, the odor was bland and the flavor enhancers masked the dried egg "henhouse" flavor. It was rated at Good - . The pH of this mixture was 8.2. With the addition of egg white solids to liquid egg whites, it is not necessary to raise the pH to a minimum of 9.0 to get good eating quality when cooked in a double-boiler. The formulation in Table No. IV contains 8% added water. A certain amount of water is required to solubilize the egg white solids. Even with this amount of water, the amount of added egg solids in relation to the added water is about 2 to 8 or approximately 20% egg white solids. With such a mixture, the total amount of egg white solids and egg white protein in the composition is much higher than in liquid egg whites themselves, as liquid egg whites contain only 12% solids and 10% protein.

TABLE NO. IV

| | Parts |
|---|---|
| Liquid Egg whites | 85.87 |
| NFMS | 2.00 |
| Egg white solids | 2.19 |
| Sucrose | 0.81 |
| CMC (HV) | 0.25 |
| CMC (LV) | 0.75 |
| Water | 8.00 |
| Atmos 300 | 0.10 |
| Color solution | 0.03 |
| Monosodium glutamate disodium inosinate and disodium guanylate (flavor enhancers) | 0.05 |
| | 100.05 |
| pH | 8.25 |
| Eating Quality - Double-Boiler Cooking | |
| Texture - Large curds | |
| Odor - Bland | |
| Flavor - Addition of flavor enhancers masked the dried egg (henhouse) flavor. | |
| Rating - Good− | |

The discovery that the addition of small percentages of egg white solids to a liquid egg white formulation enhances the texture after double-boiler cooking can be shown by comparing the liquid egg products shown in Table No. V. Formula No. 1 contains no added egg white solids, while Formula Nos. 2 and 3 contain 3% egg white solids. In all cases the pH of each of the egg white mixes was raised to a minimum of 9.0. The eating quality after double-boiler cooking of the formula containing no added egg white solids had a very poor mealy mushy mouthfeel. The flavor was bland, and eating quality was rated fair. The two formulation containing different levels of water addition gave large curds and were only slightly mealy. These products were rated good to good minus. The formula with the lesser level of added water and therefore the higher total egg solids in the mixture was rated best.

TABLE NO. V

| | No. 1 | No. 2 | No. 3 (A3-6-2) |
|---|---|---|---|
| Liquid egg whites | 94.37% | 85.87% | 87.87% |
| Egg white solids | — | 3.00 | 3.00 |
| NFMS | 2.20 | 2.00 | 2.00 |
| Potato flakettes | 3.08 | — | — |
| CMC (HV) | 0.22 | 0.25 | 0.25 |
| CMC (LV) | — | 0.75 | 0.75 |
| Water | — | 8.00 | 6.00 |
| Atmos 300 | 0.10 | 0.10 | 0.10 |
| Color solution | 0.03 | 0.03 | 0.03 |
| | 100.00% | 100.00% | 100.00% |
| *Vitamin A Palmitate | | | |
| pH | 9.0 | 9.05 | 9.05 |
| Viscosity | 1200 cps | 575 cps | 760 cps |
| Syneresis | 1.76% | 4.16% | 2.31% |
| Eating Quality - Double-Boiler Cooking | | | |
| | No. 1 | No. 2 | No. 3 |
| Texture | very mushy, mealy | large curds, sl. mealy | larger curds, sl. mealy |
| Flavor | Bland | Bland to mild | Bland to mild |

TABLE NO. V-continued

| | No. 1 | No. 2 | No. 3 (A3-6-2) |
|---|---|---|---|
| Rating | Fair | Good− | Good |

*1180 I.U./100 grams

Formula No. 1 and No. 3 were evaluated by a taste panel as shown in Table No. VI. These evaluations show that when a frozen egg white composition containing added egg white solids is compared to a formulation containing no egg white solids after cooking in a skillet, the preference is fairly evenly divided. When the formulations were compared after double-boiler cooking, the formula containing the egg white solids was definitely preferred. Five tasters out of six preferring Formula No. 3 over Formula No. 1 after double-boiler cooking.

TABLE NO. VI

TASTE PANEL EVALUATION

| | Formula No. 1 - No added Egg white solids | Formula No. 3 - Added Egg white solids |
|---|---|---|
| | SKILLET COOKED | |
| | No. 1 | No. 3 |
| Flavor* | 2.14 | 2.57 |
| Texture* | 2.71 | 2.29 |
| Preference (No. tasters) | 4 | 3 |
| | DOUBLE-BOILER COOKED | |
| Flavor* | 3.0 | 2.0 |
| Texture* | 1.0 | 3.0 |
| Preference (No. tasters) | 1 | 5 |

*Rating Scale - poor 1 fair 2 good 3 excellent 4

After a freeze-thaw cycle, Formula No. 3, designated as Formula A 3-6-2, when cooked had large curds, was slightly mealy and had some slimy mouthfeel (Table No. VII). Flavor was very bland with a slight musty background.

TABLE NO. VII

Eating Quality - Double-Boiler Cooked
Following Freeze-Thaw Cycle

| | Formula A-3-6-2 |
|---|---|
| Syneresis | 2.89% |
| Texture | Large curd, sl. mealy and slimy mouthfeel |
| Flavor | Very bland, sl. musty background notes |
| Rating | Good− |

The effect of pH on Formula A-3-6-2 is shown in Table VIII. The egg composition containing the added egg white solids generally has a pH fairly close to 9. It will vary around this pH depending on the inherent pH of the liquid egg whites and the dried egg white solids in the mixture. The egg white solids may have a pH as low as 7.5. In Table VIII is Formula A-3-6-2 to which sufficient citric acid was added to lower the pH to 7.25 or lower. The cooked eating quality was very poor. At the natural pH of 9.0, the cooked egg product had large curds and was slightly slimy. At a pH of 10.05, the egg product composition when cooked was very gelatinous.

TABLE NO. VIII

Effect of pH on Formula A-3-6-2

| pH of Formula | Texture | Rating | Syneresis % |
|---|---|---|---|
| 5.1 | Small curds, mushy | Poor | 4.4 |
| 7.25 | V. small curds, mealy | Poor + | 3.5 |
| 9.0 | Large curds, | | |

TABLE NO. VIII-continued

Effect of pH on Formula A-3-6-2

| pH of Formula | Texture | Rating | Syneresis % |
|---|---|---|---|
| 9.6 | sl. mealy Large curds, slimy | Good − | 2.9 |
| 10.05 | Fair + | 2.0 |
| | Largest curds, gelatinous | Fair | 1.7 |

Egg compositions containing primarily liquid egg whites and containing added egg white solids have a bland flavor but may sometimes have off henhouse-type flavors or some slimy mouthfeel characteristics. It has been discovered that addition of flavor enhancers, such as glutamic acid and purine compounds such as found in bakers yeast extract, or a mixture of monosodium glutamate, disodium inosinate, and disodium guanylate, at levels below 1% or even as low as 0.05% will produce meaty, pleasant flavors, have a full mouth watering effect and improved flavor, and eliminate slimy and gelatinous mouthfeel.

The baker's yeast extract at about 0.3% level gives a low meaty flavor note and is slightly salty. This product is described in co-pending application Ser. No. 349,316, filed Apr. 9, 1973, now U.S. Pat. No. 3,914,450, entitled Extract of Yeast and Processes of Making Same. The mixture of monosodium glutamate, disodium inosinate, and disodium guanylate at the 0.05% gives a full flavor which is slightly meaty and mouth watering as shown in Table IX.

TABLE NO. IX

Flavor of Formula A-3-6-2 Containing Sources of Glutamic Acid and Purine Compounds

| No. | Flavor Additive | Level Added D.S. | Flavor Profile |
|---|---|---|---|
| 1. | Bakers yeast extract (meat flavor) (56.9% solids) | 0.14% | Detectable, sl. sour, no meaty notes |
| 2. | Bakers yeast extract (meat flavor) | 0.28% | Some meaty characteristics, sl. salty |
| 3. | Bakers yeast extract (meat flavor) | 0.56% | Meaty, salty, pleasant, but too strong |
| 4. | Bakers yeast extract (neutral) (67.0% solids) | 0.17% | Very low flavor level, not readily detected |
| 5. | Bakers yeast extract (neutral) | 0.34% | Slightly meaty, salty, pleasant, savory effect, similar to MSG |
| 6. | Bakers yeast extract (neutral) | 0.67% | Same flavor effect as 0.34% but too intense |
| 7. | Monosodium glutamate, disodium inosinate and disodium guanylate composition | 0.03% | Level too low, not detectable |
| 8. | Monosodium glutamate, disodium inosinate and disodium guanylate | 0.05% | Mouth watering effect full flavor, meaty. |

TABLE NO. IX-continued

Flavor of Formula A-3-6-2 Containing Sources of Glutamic Acid and Purine Compounds

| No. | Flavor Additive | Level Added D.S. | Flavor Profile |
|---|---|---|---|
| | composition | | |

Mixtures of monosodium glutamate, disodium inosinate and disodium guanylate added to Formula A-3-6-2 at the 0.05% level were evaluated as shown in Table X. A blend of 95% monosodium glutamate and 2½% disodium inosinate and 2½% disodium guanylate are superior flavor enhancers to a liquid egg white mixture containing 3% egg white solids and no other flavor enhancers.

TABLE No. X

FORMULA No. A-3-6-2 with Flavor Enhancers - 0.05% Level

| | Taste Panel Rating |
|---|---|
| Blend 95% MSG, 2½% disodium inosinate and 2½% disodium guanylate | 1.6 |
| Blend 5% MSG, 47½% disodium inosinate and 47½% disodium guanylate | 2.4 |
| Blend 50% disodium inosinate and 50% disodium guanylate | 3.4 |

Rating Scale No. 1 Highest
No. 4 Lowest

Use of only 1 or 2 of the foregoing flavor enhancers will improve the flavor of the product of Formula A-3-6-2, but the combination of all three enhancers is preferred.

There is some variation in the amount of egg white solids, water and non-fat milk solids that may be added to Formula A-3-6-2. Results of some of these variations are shown in Table No. XI where the egg white solids was varied from 2 to 3%, the water from 0 to 6% and the non-fat milk solids to 2 to 3%. All formulas gave fair plus to good ratings after double-boiler cooking.

TABLE NO. XI

Effect of Formula Variations of Base Formula A-3-6-2

| % Liquid Egg Whites | Egg White Solids | Water | NFMS | Viscosity | Rating After Double-Boiler Cooking |
|---|---|---|---|---|---|
| 87.9 | 3 | 6 | 2 | 700 cps | Good− |
| 86.9 | 3 | 6 | 3 | 875 cps | Fair+ |
| 87.9 | 2 | 6 | 3 | 880 cps | Fair+ |
| 89.9 | 2 | 4 | 3 | 970 cps | Good− |
| 89.9 | 3 | 4 | 2 | 635 cps | Good |
| 91.9 | 3 | 2 | 2 | 650 cps | Good |
| 93.9 | 3 | 0 | 2 | 750 cps | Good− |

In a liquid egg white formula containing 3% egg white solids, the lack of potato flakettes causes appreciable syneresis. The mixture of carboxymethyl cellulose gum of a low (LV), high (HV) and extra high water binding capacity (MV) can minimize this syneresis effect as shown in the following Table III.

TABLE NO. XII

Effects of Cellulose (CMC) Gums on Formula No. A3-6-2 (3% Egg White Solids, 6% Water, 2% NFMS)

| | CMC | | | Viscosity | | Double-Boiler Cooking |
|---|---|---|---|---|---|---|
| | HV | LV | MV | Total | cps | Synersis | Quality |
| | % | % | % | % | | % | |
| 1 | 0.25 | 0.75 | — | 1.00 | 780 | 2.35 | Good |
| 2 | 0.25 | 0.75 | 0.10 | 1.10 | 890 | 2.74 | Fair+ |
| 3 | 0.25 | 0.75 | 0.20 | 1.20 | 1750 | 2.80 | Fair |
| 4 | 0.25 | 0.50 | 0.25 | 1.00 | 1175 | 2.04 | Fair— |
| 5 | 0.25 | — | 0.50 | 0.75 | 1390 | 0.75 | Fair |
| 6 | | 0.75 | 0.25 | 1.00 | 270 | 4.51 | Good |
| 7 | | 0.50 | 0.50 | 1.00 | 400 | 4.41 | Fair+ |
| 8 | | — | 1.00 | 1.00 | 1450 | 1.20 | Fair |
| 9 | | — | 0.75 | 0.75 | 690 | 1.79 | Good |

HV High Viscosity CMC
LV Low Viscosity CMC
MV Medium Viscosity, High Water-Binding CMC Similar variations in the other ingredients to the basic A 3-6-2 formula are shown in Table XIII.

TABLE NO. XIII

Formula variations with basic formula A 3-6-2- variations in egg white solids, water, NFMS, and CMC.

| Egg White Solids | Water | NFMS | H.V. CMC | L.V. CMC | M.V. CMC | Syneresis | Double-Boiler Cooking Quality |
|---|---|---|---|---|---|---|---|
| 3.0 | 6.0 | 2.0 | 0.25 | 0.75 | — | 4.00 | Fair+ |
| 3.0 | 6.0 | 2.5 | 0.25 | 0.75 | — | 2.94 | Good— |
| 3.0 | 6.0 | 2.5 | — | — | 0.85 | 2.00 | Good |
| 3.0 | 6.0 | 2.5 | 0.25 | 0.75 | — | 2.85 | Good— |
| 2.0 | 4.0 | 3.0 | 0.25 | 0.75 | — | 2.03 | Good— |
| 2.5 | 6.0 | 3.0 | — | — | 0.85 | 2.89 | Good— |
| 2.0 | 5.0 | 3.5 | 0.25 | 0.75 | — | 2.59 | Fair+ |

The basic formula containing egg white solids, water and non-fat milk solids can be varied by the addition of a vegetable starch such as tapioca starch, but such additions are not necessary for double-boiler cooking quality of an egg white based formula containing non-egg white solids. These data are demonstrated in Table XIV.

TABLE NO. XIV

Formula variations with basic formula No. A 3-6-2 - tapioca starch

| FORMULA | | | | | Double-Boiler Cooking |
|---|---|---|---|---|---|
| Egg White Solids | Water | NFMS | Tapioca Starch | Syneresis | Quality |
| % | % | % | % | % | |
| 3 | 6 | 2 | — | 2.66 | Good |
| 3 | 6 | 1.75 | 0.25* | 2.66 | Good— |
| 3 | 6 | 1.75 | 0.25** | 2.06 | Good |

*Super gel No. 4143
**Tap-O-Sol

It has been found that the temperature of pasteurization will affect the quality of liquid egg whites when liquid egg whites are pasteurized at temperatures of 135°–140° F. or above. There is a certain degree of coagulation of the protein and such liquid egg whites may have poor whipping properties. If Formula A 3-6-2 which contains approximately 88% liquid egg whites is pasteurized at 130° F. for 4–5 minutes using the hydrogen peroxide method, the eating quality is good with a low level of syneresis when cooked in a double boiler. If the formula is pasteurized at 137° F. for 4–5 minutes, there is a greater degree of syneresis although the fresh cooked eating quality is good. These data are shown in Table XV.

TABLE NO. XV

Effect of Pasteurization Temperature on Formula No. A-3-6-2

| Pasteurization Temp. | Time | pH | Eating Quality | Syneresis |
|---|---|---|---|---|
| 130 | 4 min. | 8.95 | Good | 2.69* |
| 137 | 4 min. | 9.00 | Good | 5.00 |

*Double Boiler Cooked

Example A shows the preparation of a spray-dried product having the composition of Formula A-3-6-2. This spray-dried product mixed with water will reconstitute to an egg product which scrambles in a skillet with good cooking tolerance. There is none of the dried egg flavor which is characteristic of spray-dried egg products.

EXAMPLE A

Similar proportions of the same ingredients as in Formula A-3-6-2 (liquid or frozen) was spray-dried. A Niro Utility spray dryer was employed. This dryer has a two fluid nozzle and the product was atomized at 25–30 psi. Inlet temperature was 155°–160° C., exhaust temperature was 65°–70° C.

One part of the spray-dried blend is mixed with 5 parts of water. The reconstituted mixture, when prepared as scrambled eggs in a skillet, has the same good cooking tolerance and texture as the liquid or frozen product, with no objectionable flavor or odor as often identified with other dry egg products, as shown in Table No. XVI. This product also reliquefies at a ratio of five parts of water to one part of product, instead of the conventional three to one ratio; yet still retains moisture when coagulated or cooked.

TABLE NO. XVI

Evaluation of spray-dried formula No. A3-6-2*

| Reconstitution Ratio | Rating |
|---|---|
| 1 pt. solids - 3 pt. water | Good |
| 1 pt. solids - 4 pt. water | Good |
| 1 pt. solids - 5 pt. water | Good (best) |

*Spray-dried to 4.9% moisture

As noted in Formula A-3-6-2 the liquid or frozen product contains dry egg whites and water. For practical purposes, when drying, the dry egg whites and water could be eliminated and replaced with liquid whites.

TABLE NO. XVII

| | Liquid Formula | Formula for spray-drying |
|---|---|---|
| Liquid egg whites | 88.515% | 96.815% |
| Water | 5.300 | |
| Egg white solids | 3.000 | — |

TABLE NO. XVII-continued

|  | Liquid Formula | Formula for spray-drying |
|---|---|---|
| NFMS | 2.000 | 2.000 |
| CMC (LV) | 0.750 | 0.750 |
| CMC (HV) | 0.250 | 0.250 |
| Atmos 300 | 0.100 | 0.100 |
| Flavor enhancer | 0.050 | 0.050 |
| Color sol. 8051 | 0.035 | 0.035 |
|  | 100.000% | 100.000% |

EXAMPLE B

DRY BLENDED MIX

The liquid formula A-3-6-2 was converted from a liquid to dry solids proportion and the ingredients were dry blended. When reconstituted with the proper amount of water, the cooking tolerance of the dry blended formula was not as good as the spray-dried product. The flavor and odor level was higher and was characteristic of denatured protein. The following Table No. XVIII shows the conversion of Formula A-3-6-2 to a dry basis.

TABLE NO. XVIII

|  | Liquid Formula | % Dry Solids | % Dry Solids Blend |  |
|---|---|---|---|---|
| Liquid egg whites | 88.515% | 10.622 | 63.67 | 81.67% |
| Water | 5.300 | — |  |  |
| Egg white solids | 3.000 | 3.000 | 18.00 |  |
| NFMS | 2.000 | 2.000 | 12.00 |  |
| CMC (LV) | 0.750 | 0.750 | 1.50 |  |
| CMC (HV) | 0.250 | 0.250 | 4.50 |  |
| Atmos 300 | 0.100 | — | — |  |
| Flavor Enhancer | 0.050 | 0.050 | 0.03 |  |
| Color Sol. No. 8051 | 0.035 | 0.004 | 0.03 |  |
|  | 100.000% | 16.676% | 100.00% |  |

To formula A-3-6-2 can be added hydroxypropyl cellulose, methocel, sodium bicarbonate, an acid phosphate salt and other ingredients similar to the formula in U.S. Pat. No. 3,769,404 and this product can be used to make cholesterol-free omelets.

The following tables, Tables XIX and XX show that the level of egg white on a solids basis can be varied from about 12.5% to about 16% to achieve the results of this invention.

TABLE NO. XIX

Effects of 0-7% Egg White Solids, Variable Liquid Egg Whites. Other Ingredients Constant in Formula A-3-6-2

| Formula No. | Level of Egg White Solids | Liquid Egg Whites | pH | Viscosity | Syneresis | Cooking Tolerance | Texture | %Egg White Solids* Dry Weight Basis |
|---|---|---|---|---|---|---|---|---|
|  | % | % |  | cps | % |  |  |  |
| 1 | 0 | 91.515 | 8.80 | 300 | 5.06 | very small curds(Poor) | very mushy mealy (Poor) | 11.0 |
| 2 | 0.5 | 91.015 | 8.85 | 380 | 4.79 | small curds (Poor+) | very mushy mealy (Poor) | 11.4 |
| 3 | 1.0 | 90.515 | 8.85 | 380 | 4.52 | small curds (Fair−) | mealy, mushy (Fair−) | 11.8 |
| 4 | 2.0 | 89.515 | 8.90 | 480 | 4.72 | med. curds (Good−) | sl. mealy, mushy (Good−) | 12.5 |
| 5 | 3.0 | 88.515 | 8.90 | 575 | 3.43 | med. to large curds (Good) | med. firm sl. mealy (Good) | 13.3 |
| 6 | 4.0 | 87.515 | 8.95 | 670 | 2.41 | med. to large curds (Good) | firm mealy (Good) | 14.1 |
| 7 | 5.0 | 86.515 | 8.95 | 660 | 1.82 | large curds (Good+) | very firm mealy (Good−) | 15.0 |
| 8 | 6.0 | 85.515 | 8.95 | 710 | 1.20 | very large curds (Excellent) | very firm, rubbery, mealy (Fair+) | 15.8 |
| 9 | 7.0 | 84.515 | 9.00 | 830 | 0.90 | very large curds (Excellent) | very firm, mealy, very rubbery (Fair−) | 16.5 |

Notes
No. 6-9 odor and flavor level higher, with increase in albumen solids.
*Liquid egg white contain 12% solids
*Dried egg whites contain 91% solids

TABLE NO. XX

Effects of 5.3 - 14% Water, Variable Liquid Egg Whites. Other Ingredients Constant in Formula A-3-6-2

| Formula No. | Level of Water | Liquid Egg Whites | pH | Viscosity | Syneresis | Cooking Tolerance | Texture | % Egg White Solids* Dry Weight Basis |
|---|---|---|---|---|---|---|---|---|
|  |  |  |  | cps | % |  |  |  |
| 1 | 5.3 | 88.515 | 8.90 | 530 | 3.46 | med. to large curds (Good) | sl. mealy med. firm (Good) | 13.3 |
| 2 | 6.0 | 87.815 | 8.90 | 450 | 4.00 | med. curds (Good) | sl. mealy med. firm (Good) | 13.2 |
| 3 | 8.0 | 85.815 | 8.90 | 430 | 4.46 | med. large curds (Good) | sl. mealy mushy, soft to firm (Good−) | 13.0 |
| 4 | 10.0 | 83.815 | 8.90 | 450 | 4.80 | med. curds (Good−) | mushy mealy wet (Fair+) | 12.8 |
| 5 | 12.0 | 81.815 | 8.90 | 460 | 5.26 | med. curds (Good−) | mushy, mealy wet (Fair+) | 12.5 |
| 6 | 14.0 | 79.815 | 8.90 | 440 | 5.20 | small to med. | mealy, mushy | 12.3 |

TABLE NO. XX-continued

Effects of 5.3 - 14% Water, Variable Liquid Egg Whites. Other Ingredients Constant in Formula A-3-6-2

| Formula No. | Level of Water | Liquid Egg Whites | pH | Viscosity | Syneresis | Cooking Tolerance | Texture | % Egg White Solids* Dry Weight Basis |
|---|---|---|---|---|---|---|---|---|
| | | | | | | curds (Fair) | wet (Fair−) | |

Notes
*Liquid egg whites containing 12% solids
*Dried egg whites containing 91% solids On a weight basis, the composition can contain about 12.5% to about 16% egg white solids, about 0.25% to about 1.3% vegetable gums, about 1.0% to about 3.5% non-fat milk solids, and about 0.04% to about 1% flavor enhancers. The remainder is water, i.e., about 80% to about 85%.

The vegetable gums are preferably 0.75 to 1.3% carboxymethyl cellulose of 25 to 3000 cps viscosity and a 0.65 to 0.95 degree of substitution. The preferred combination of carboxymethyl cellulose is comprised of 0.10% to 0.25% of a high viscosity 1000 to 2,800 cps in a 1% solution with a 0.65 to 0.95 degree of substitution; 0.10% to 1.00% of medium viscosity 800 to 3000 cps in a 2% solution with a 0.80 to 0.95 degree of substitution; and 0.50% to 0.75% of low viscosity 25 to 50 cps in a 2% solution with a 0.65 to 0.85 degree of substitution.

The combination of vegetable gums must give a good eating quality and a syneresis value of less than about 5%. The foregoing combination of carboxymethyl cellulose gives these properties. Other gums and combinations of gums may also be formulated to give these properties.

Method of determining viscosity values published by Hercules, Inc. in a publication copyrighted in 1971 entitled Cellulose Gum—Chemical and Physical Properties.

The average number of carboxymethyl groups that are substituted per anhydroglucose unit is known as the "degree of substitution" or D.S.

The syneresis is determined by the following method:

TEST METHOD FOR SYNERESIS

Apparatus
1. 1½ quart Pyrex double-boiler
2. Gas or electric heating elements.
3. Plastic scraper.
4. Thermometer.
5. Aluminum foil.
6. 16 oz. or 5 in. funnel. No screen required.
7. 25 ml. graduated cylinder.
8. Automatic timer.

Procedure
1. Heat water to a full boil in bottom portion of double-boiler.
2. Melt 6 gms. of margarine in top portion of boiler.
3. Add 200 gms of egg product at 68° F. into boiler and allow to cook 2 minutes before scraping. Scrape with plastic scraper.
4. Continue scraping thoroughly each minute thereafter until a total cooking time of 9 minutes has been attained.
   Note: When not scraping replace cover on double-boiler.
5. Weigh cooked eggs from kettle and place in funnel.
6. Cover top of funnel with aluminum foil and set at room temperature, allowing filtrate to collect in graduate.

Calculate percentage syneresis at 1 hour.

$$\frac{\text{Filtrate} \times 100}{\text{Wt. of cooked egg}} = \% \text{ Syneresis}$$

Normal % Syneresis 3 to 5%.
% Syneresis should not exceed 5.0%.

A small but effective amount of an anti-foam such as Atmos 300 which is a mixture of mono and diglycerides of fat-forming fatty acids manufactured by ICI of America, Inc. will minimize foaming as previously pointed out.

The flavor enhancer can be the yeast extract of application Ser. No. 349,316 or a mixture of 0.002 to 0.95% monosodium glutamate; 0.001 to 0.50% disodium inosinate; and 0.001 to 0.50% disodium guanylate. From about 0.04 to about 1% flavor enhancer is used.

Following is an example of a large scale run of this invention.

EXAMPLE B

Commercial Processing of 10,000 lbs. of A-3-6-2 Low Cholesterol Egg Product

Blending
Into 12,000 lb. capacity refrigerated blending tank add 8,852 lbs. of liquid egg whites and 530 lbs. of water. Start tank agitator and circulate whites and water mixture past power funnel with centrifugal pump (Tri-Blendor).
Add the following ingredients through funnel:
1. 10 lbs. of Atmos 300 and 54 gms. of Vitamin A Palmitate in vegetable oil, mix for 5 minutes.
2. 300 lbs. of egg white solids, mix for 10 minutes.
3. Add dry blend of 200 lbs. of NFMS, 75 lbs. of CMC (LV) and 25 lbs. of CMC H.V., 5 lbs. of flavor enhancer.
4. Add 3.5 lbs. of color solution and continue blending entire formula for a minimum of 15 minutes. Homogenized in a two phase Manton-Gaulin homogenizer, using 750 psigs through the first stage and 1250 psigs through the second stage. Total 2000 psig. Pasteurize at 127°—130° F. for 4 minutes with peroxide injection. Cool to 35°–40° F. Transfer to refrigerated holding tank to dissipate the peroxide. Pack product at 35°–40° F. Freeze in blast freezer.

What is claimed is:
1. A cholesterol-free low calorie egg product comprising by weight
   a. liquid egg whites to which a small percentage of dried egg white solids are added in amount sufficient to provide about 12.5 to about 16% egg white solids, b. about 80 to about 85% water derived at least in major part from said liquid egg whites, c. and non-egg ingredients comprising vegetable gum and non-fat milk solids to give a syneresis value after double-boiler cooking of less than about 5%, d. the product having substantially no fat, cholesterol, or egg yolk and capable of being cooked into a scrambled egg type product.

2. The product of claim 1 including about 0.025% to about 1.3% vegetable gum, and about 1 to about 3.5% non-fat milk solids.

3. The product of claim 1 including about 0.04 to about 1% flavor enhancer.

4. The product of claim 3 wherein the flavor enhancer is yeast extract.

5. The product of claim 1 wherein the egg white solids are derived from about 88% liquid egg white and about 3% dried egg white solids, and including about 2% non-fat milk solids about 0.25% carboxymethyl cellulose of high viscosity and about 0.75% carboxymethyl cellulose of low viscosity, and about 6% added water in addition to the water in the liquid egg whites.

6. The product of claim which is frozen.

7. An egg product as defined in claim 1 wherein the amount of said dried egg white solids is at least about 2%.

8. An egg product as defined in claim 1 wherein the amount of said dried egg white solids is about 2–6% and said liquid egg whites are present in about 85–90% by weight.

9. A method of making a cholesterol-free low calorie egg product comprising the steps of:

a. combining liquid egg whites and dried egg white solids with vegetable gum and non-fat milk solids to form a liquid product containing on a solids basis about 12.5 to about 16% egg white solids, and b. pasteurizing the liquid product at a temperature less than about 135° F., said product having a syneresis value of less than about 5% when cooked in a double-boiler, and having substantially no egg yolk, no fat, and no cholesterol and a calorie content less than that of the same weight of fresh whole eggs.

10. A method as defined in claim 9 wherein the amount of said dried egg white solids is at least about 2%.

11. A method as defined in claim 9 wherein the amount of said dried egg white solids is about 2–6% and said liquid egg whites are present in about 85–90% by weight.

* * * * *

Notice of Adverse Decision in Interference

In Interference No. 100,123, involving Patent No. 3,987,212, R. D. Seeley, H. J. Hartman, and D. R. Sidoti, CHOLESTEROL FREE EGG PRODUCT, final judgment adverse to the patentees was rendered Apr. 30, 1980, as to claims 1–3, 6, 7, 9 and 10.

[*Official Gazette July 22, 1980.*]